July 4, 1944.    W. KRIEGSHEIM    2,353,044
FILM MAGAZINE
Filed May 9, 1942

INVENTOR
WILLIAM KRIEGSHEIM
BY
ATTORNEY

Patented July 4, 1944

2,353,044

UNITED STATES PATENT OFFICE 2,353,044

FILM MAGAZINE

William Kriegsheim, Long Island City, N. Y.

Application May 9, 1942, Serial No. 442,323

4 Claims. (Cl. 242—71)

My invention relates to film magazines and more particularly to film magazines of the type designed for use with so-called magazine loading cameras and containing the film in the form of a delivery roll arranged to be progressively exposed through the camera lens at will for photographic purposes and progressively rewound on a take-up spool in said magazine.

My invention has for its object to provide a simple and novel controlling device for said magazines whereby all types of film may be efficiently controlled so as to avoid any undesirable uncoiling and jamming of the film regardless of its type.

My invention contemplates further the provision of a novel controlling device in said magazines whereby a balanced effect will be developed on the delivery roll of film and on the take-up roll of film being wound upon the take-up spool and whereby said controlling effect will be maintained substantially constant throughout the entire transfer of the film from one spool to the other.

A further object of the invention is to provide a novel controlling device which may be readily combined with a magazine and removed therefrom at will in a simple manner requiring no particular skill.

Other objects will appear from the the description hereinafter and the features of novelty will be pointed out in the claims.

Figure 1:
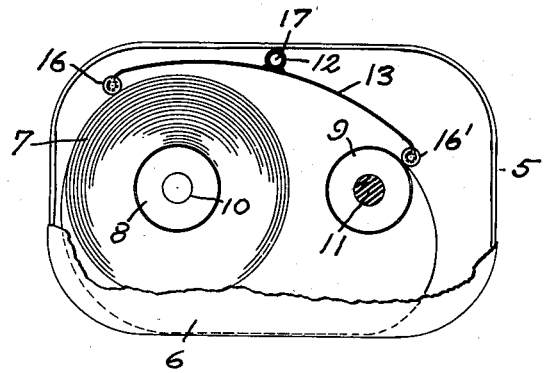
Figure 2:
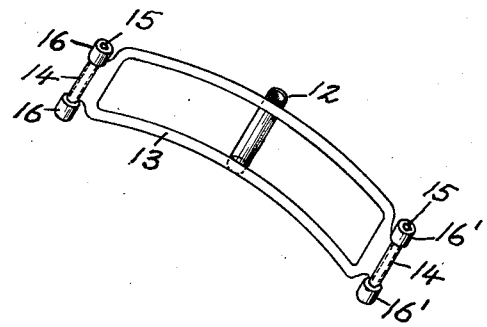

In the accompanying drawing which illustrates an example of the invention without defining its limits, Fig. 1 is a face view of the magazine with the cover partly broken away and the novel controlling device embodied therein, and Fig. 2 is a perspective view of the novel controlling device in a preferred form.

The magazine itself may be of any conventional type and construction, and includes a case 5 of suitable dimensions and shape to properly co-operate with the camera for which it is designed, said case being made of any material suitable for the purpose. The case 5 is normally closed by means of a cover 6 which may be frictionally fitted upon said case or otherwise removably secured thereon in any convenient way. A delivery roll of film 7 coiled upon a suitable spool 8 which may be termed the delivery spool, and a take-up spool 9 are rotatably mounted respectively upon studs or posts 10 and 11.

In the conventional arrangement of magazines of the class under discussion, the stud 10 is mounted upon and projects from the bottom of the case 5 in perpendicular relation thereto, while the stud 11 is mounted upon and projects from the cover 6 in corresponding perpendicular relation thereto. The take-up spool 9 is constructed for co-operation with a winding device customarily forming part of the cameras to which the magazine applies, the arrangement being such that when the magazine is in place in the camera this winding device may be connected with the spool 9 in order to enable the same to be rotatively actuated on the stud 11 for the purpose of winding the film thereon subsequent to exposure. Generally speaking, the spool 8 is correspondingly constructed so that when a roll of film has been transferred therefrom to the spool 9, the empty spool 8 in turn may be used as a take-up spool for the next roll of film. The magazine further may be provided with the customary film guiding means and exposure openings, the latter in turn being provided with the conventional adjustable closures whereby light is normally prevented from reaching the film in the magazine. The closure devices are constructed and arranged for adjustment to the open position by means conventionally provided on the camera in the well-known way. The magazine in addition may include any other customary or special features which may be required therein.

The novel controlling device as shown in Fig. 2 comprises a tubular bearing 12 and a resilient frame 13 secured to said tubular bearing 12 and extending in opposite directions therefrom in symmetrical relation thereto. At its opposite ends the resilient frame preferably is provided with bearing sleeves 14 in which pin shafts 15 are rotatably mounted. The shafts 15 in the illustrated example project beyond the opposite ends of the bearing sleeves 14 and are provided respectively with rollers 16 and 16' fixed upon said shafts 15 in any convenient manner.

In practice the novel controlling device is mounted within the case 5 in such a manner that the tubular bearing 12 is supported therein with the frame 13 projecting in opposite directions therefrom and with the rollers 16 and 16' of each pair in engagement respectively with the surface of the delivery roll of film 7 and initially with the surface of the take-up spool 9 and subsequently with the take-up roll of film which is progressively coiled thereon. Preferably the tubular bearing is loosely mounted upon a stud 17 which is suitably fixed in place in the case 5 so as to be capable of rocking thereon and at the same time so as to be removable therefrom at will to disconnect the controlling device from the case 5 at will.

The parts are so arranged and dimensioned that the resilient frame 13 will be deflected when the rollers 16 are in engagement with the surface of the delivery roll of film 7 and with the surface of the spool 9 or the take-up roll of film thereof respectively. As a result of this, a predetermined amount of pressure is exerted by the rollers 16 and 16' through the resilient frame 13 against the surfaces of the film upon both the delivery spool 8 and the take-up spool 9.

As the film is progressively exposed in the camera and wound upon the take-up spool 9 as the camera is used for photographic purposes, the outside diameter of the delivery roll of film 7 on the spool 8 will progressively decrease while the outside diameter of the take-up roll of film being wound upon the take-up spool 9 will correspondingly increase. As this variation in the outside diameters of the respective rolls of film takes place, the controlling device will pivotally rock upon the stud 17 and the rollers 16 and 16' will remain in contact respectively with the two rolls of film. There is accordingly no substantial change in the pressure developed by the resilient frame 13 during such pivotal adjustment of controlling device. As a result of this arrangement the pressure of the rollers 16 and 16' upon the respective rolls of film will remain substantially constant throughout the entire period during which the film is transferred from the spool 8 to the spool 9. The pressure of the rollers 16 against the delivery roll of film on the spool 8 prevents undesirable uncoiling of this roll of film, while the pressure of the rollers 16' on the take-up roll of film insure an efficient and tight winding of the film 7 upon the take-up spool 8.

If as is preferred the controlling device is removable from the stud 17, it may easily be taken from the case 5 to reduce to the simplest operation the removal of an exposed film from said case and the introduction of a new roll of unexposed film into the same.

Although the present invention has been described in conjunction with a preferred embodiment, it is to be understood that modifications and variations may be resorted to without departing from the spirit and scope of the invention, as those skilled in the art will readily understand. Thus it will be observed that the controlling device may be permanently mounted in a case and that the pressure developing rollers instead of being mounted upon a resilient frame may be mounted upon a corresponding resilient device of different specific construction. Such variations and modifications are considered to be within the purview and scope of the claims.

I claim:

1. In a film magazine for cameras including a case arranged to rotatably contain a delivery spool having delivery roll of unexposed film thereon and a take-up spool on which said film is progressively wound as a take-up roll subsequent to exposure, that improvement which comprises a resilient controlling device pivotally mounted in said case at a point between the axes of rotation of said spools and extending in opposite directions from said pivot into engagement with each of said rolls of film to develop a balanced pressure thereon which remains substantially constant throughout the entire period of transfer of said film from said delivery spool to said take-up spool regardless of progressive changes in the diameters of said rolls of film whereby uncoiling of the delivery roll of film is prevented and compact coiling of the take-up roll of film is insured.

2. In a film magazine for cameras including a case arranged to rotatably contain a delivery spool having delivery roll of unexposed film thereon and a take-up spool on which said film is progressively wound as a take-up roll subsequent to exposure, that improvement which comprises a bearing member in said case in predetermined relation to the axes of rotation of said spools, a resilient controlling device movably mounted on said bearing member and projecting therefrom toward said spools, and rollers carried by said device for engagement with each of said rolls of film to develop a balanced pressure thereon whereby uncoiling of said delivery roll of film is prevented and compact coiling of said take-up roll of film is insured.

3. In a film magazine for cameras including a case arranged to rotatably contain a delivery spool having delivery roll of unexposed film thereon and a take-up spool on which said film is progressively wound as a take-up roll subsequent to exposure, that improvement which comprises a stud fixed in said case at a point between the axes of rotation of said spools, a tubular bearing pivotally mounted on said stud; resilient members fixed on said tubular bearing and projecting in opposite directions therefrom in symmetrical relation to said bearing, and rollers journalled on the opposite ends of said members for engagement with each of said rolls of film to develop a balanced pressure thereon whereby uncoiling of said delivery roll of film is prevented and compact coiling of said take-up roll of film is insured.

4. In a film magazine for cameras including a case arranged to rotatably contain a delivery spool having delivery roll of unexposed film thereon and a take-up spool on which said film is progressively wound as a take-up roll subsequent to exposure, that improvement which comprises a stud fixed in said case at a point between the axes of rotation of said spools, a tubular bearing removably mounted on said stud, a resilient frame fixed on said tubular bearing and projecting in opposite directions therefrom in symmetrical relation to said bearing, and co-operating pairs of rollers rotatably carried by said frame at its opposite ends for engagement with each of said rolls of film to develop a balanced pressure thereon whereby uncoiling of said delivery roll of film is prevented and compact coiling of said take-up roll of film is insured.

WILLIAM KRIEGSHEIM.